US 6,721,123 B2

(12) United States Patent
Sueki et al.

(10) Patent No.: US 6,721,123 B2
(45) Date of Patent: Apr. 13, 2004

(54) MAGNETIC TAPE RECORDING MEDIUM, MAGNETIC TAPE RECORDING AND REPRODUCING APPARATUS, MAGNETIC TAPE RECORDING METHOD AND MAGNETIC TAPE CASSETTE

(75) Inventors: Minoru Sueki, Kanagawa (JP); Kiyomi Ejiri, Kanagawa (JP); Kiyoo Morita, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 362 days.

(21) Appl. No.: 09/946,470

(22) Filed: Sep. 6, 2001

(65) Prior Publication Data

US 2002/0027738 A1 Mar. 7, 2002

(30) Foreign Application Priority Data

Sep. 7, 2000 (JP) ..................................... P. 2000-272031

(51) Int. Cl.[7] .......................... G11B 5/584; G11B 5/09; G11B 17/00
(52) U.S. Cl. ...................... 360/77.12; 360/48; 360/72.1
(58) Field of Search .............................. 360/76, 77.12, 360/78.02, 48, 72.1

(56) References Cited

U.S. PATENT DOCUMENTS 6,141,174 A * 10/2000 Judge et al. .................. 360/76
6,222,698 B1 * 4/2001 Barndt et al. ................. 360/76
6,275,350 B1 * 8/2001 Barndt ..................... 360/77.12

* cited by examiner

Primary Examiner—David Hudspeth
Assistant Examiner—Jason Olson
(74) Attorney, Agent, or Firm—Sughrue Mion, PLLC

(57) ABSTRACT

A magnetic tape includes two servo tracks respectively extending in the longitudinal direction of the magnetic tape from the tape-width-direction two end portions of the magnetic tape, and a data area interposed between the two servo tracks. The azimuth angle θ° of the data track of the data area satisfies an equation of $$0 \le \theta \le \tan^{-1}\left(\frac{10p}{a \times L}\right),$$

where a data track pitch is expressed as p (m), a magnetic tape width is expressed as L (m) and the greatest dimension change rate is expressed as (a) (%). Since the azimuth angle θ° is determined in this manner, even in the case where the magnetic tape is deformed in shape and/or changed in dimension, an offtrack error can be prevented and thus, the data track can be traced in the data area accurately.

18 Claims, 4 Drawing Sheets

MAGNETIC TAPE RECORDING MEDIUM, MAGNETIC TAPE RECORDING AND REPRODUCING APPARATUS, MAGNETIC TAPE RECORDING METHOD AND MAGNETIC TAPE CASSETTE

BACKGROUND OF THE INVENTION

The present invention relates to a magnetic tape recording medium including data tracks, a magnetic tape recording and reproducing apparatus for recording and reproducing data tracks, a magnetic tape recording method, and a magnetic tape cassette.

As a linear system for recording and reproducing data tracks existing in the data area of a magnetic tape, there is known an LTO (Linear Tape Open) standard.

In a linear system, a magnetic tape including a servo track recorded in the longitudinal direction of the magnetic tape is fed in the longitudinal direction thereof. A fixed magnetic head is contacted with the servo track to thereby read out a servo track signal recorded in the servo track in the longitudinal direction of the magnetic tape. While controlling the magnetic head so as to restrain an offtrack error, a data track existing in the data area of a magnetic tape and arranged in parallel to the servo track is traced accurately to thereby record and reproduce the data track.

Further, in the linear system, a position information signal encoded in the servo track signal is read out to thereby cue up the data of the data track.

On the other hand, in a helical system in which, differently from the above linear system, a data track existing in the data area of a magnetic tape is arranged obliquely. A servo track signal recorded in a servo track existing in one end of the magnetic tape and extending in the longitudinal direction of the magnetic tape is read out. In accordance with a servo tracking signal, while controlling a drum magnetic head, a drum magnetic head is controlled so as to restrain an off-track error.

Also, in the case of the data cueing, as in a DDS (Digital Data Storage) system, a position information signal embedded (superimposed) into the data is read out; or, as in a D1 system, a position information signal is recorded in the longitudinal direction of a magnetic tape simultaneously when the data is recorded.

However, in either of the above-mentioned conventional systems, there is a possibility that, in case where the magnetic tape is deformed in shape or changed in dimension due to the temperature and humidity, the servo track signal or position information signal cannot be read out accurately, thereby making it impossible to read out the data.

In the linear system, in case where the magnetic tape is deformed in shape or changed in dimension, the distance between the servo track and data area is caused to vary, with the result that there can occur an offtrack error or mutually adjoining servo tracks or data tracks can be overwritten.

Also, in the helical system, in case where the magnetic tape is deformed in shape or changed in dimension, the azimuth angle is caused to vary or the pitch distance of the data track is caused to vary (especially, reduce), which makes it impossible to read out the data with accuracy.

SUMMARY OF THE INVENTION

The present invention aims at eliminating the drawbacks found in the above-mentioned conventional systems. Accordingly, it is an object of the invention to provide a magnetic tape recording medium, a magnetic tape recording and reproducing apparatus, a magnetic tape recording method, and a magnetic tape cassette which are respectively enhanced in durability against the shape deformation or dimensional change of a magnetic tape.

In attaining the above object, according to a first aspect of the invention, there is provided a magnetic tape recording medium for magnetically recording and reproducing data tracks sequentially with respect to the data area of a magnetic tape at an azimuth angle $\theta°$, wherein the magnetic tape includes two servo tracks respectively situated in the portions of the magnetic tape existing inwardly of the width-direction two end portions of the magnetic tape and formed in a belt-like shape extending in parallel to the longitudinal direction of the magnetic tape, each of the servo tracks having therein a previously recorded servo track signal including position information recorded in the longitudinal direction of the magnetic tape for representing the position of the magnetic tape and tracking information recorded in parallel to the data tracks, and also wherein the azimuth angle $\theta°$ satisfies an equation of $$0 \leq \theta \leq \tan^{-1}(10\, p/a \times L),$$

where the tape width of the magnetic tape is expressed as L (m), a data track pitch in the data area is expressed as p (m), and the longitudinal-direction greatest dimension change rate of the magnetic tape due to the temperature and humidity is expressed as a (%)

According to the present magnetic tape recording medium, even in case where the magnetic tape recording medium is deformed in shape or changed in dimension, there can be eliminated an offtrack error and thus the data tracks can be traced accurately in the data area of the magnetic tape.

Also, since the servo tracks are respectively disposed inwardly of the tape-width-direction two end portions of the magnetic tape, the tracking accuracy of the magnetic tape recording medium can be enhanced.

Further, because the servo track signal is previously recorded in each of the servo tracks, there can be reduced a harmful effect on tracing variations inevitably occurring in the recording and reproducing operations of a magnetic tape recording and reproducing apparatus which is used to record and reproduce the magnetic tape recording medium.

The magnetic tape recording medium according to the invention is also characterized in that the servo tracks are disposed so as to place the data area between them in the magnetic tape width direction and also that the position information of the servo track signal is magnetically recorded in the longitudinal direction of the magnetic tape.

That is, according to the present magnetic tape recording medium, since the servo tracks are disposed such that they exist inwardly of the tape-width-direction two end portions while the data area of the magnetic tape is interposed between them, the tracking accuracy thereof can enhanced.

Also, even in case where the magnetic tape recording medium is deformed in shape or changed in dimension, because the position information is magnetically recorded in the longitudinal direction of the magnetic tape, a read error is hard to occur.

In the magnetic tape recording medium according to the invention, the servo tracks are situated so as to place the data area between them in the magnetic tape width direction, and also that the position information of the servo track signal has a pattern formed in the longitudinal-direction magnetic surface of the magnetic tape so as to be optically readable. Instead of the pattern, the position information of the servo track signal may have a bit hole formed in the longitudinal direction of the magnetic tape.

That is, according to the present magnetic tape recording medium, since the servo tracks are disposed such that they exist inwardly of the tape-width-direction two end portions while the data area of the magnetic tape is interposed between them, the tracking accuracy thereof can enhanced.

Also, even in case where the magnetic tape recording medium is deformed in shape or changed in dimension, because the position information is composed of a pattern formed in the magnetic surface of the magnetic tape in the longitudinal direction of the magnetic tape so as to be optically readable, or a bit hole formed recorded in the longitudinal direction of the magnetic tape, a read error is hard to occur.

It is preferable for the magnetic tape recording medium according to the invention that the position information of the servo track signal is composed of a pattern magnetically recorded in the longitudinal direction of the magnetic tape on the opposite surface of the magnetic surface where the data area is to be recorded, or a pattern which is formed on the present opposite surface so as to be optically readable.

That is, according to the present magnetic tape record medium, even in case where the magnetic tape recording medium is deformed in shape or changed in dimension, because the position information is a pattern which is magnetically recorded in the longitudinal direction of the magnetic tape or can be optically read, a read error is hard to occur.

Also, since the position information of the servo track signal is recorded on the opposite surface of the magnetic surface on which the data area is to be recorded, the data area can be spread by an amount equivalent to the area of the servo track where the position information is recorded, which makes it possible to increase the storage capacity of the magnetic tape recording medium.

According to a second aspect of the invention, there is provided a magnetic tape recording and reproducing apparatus for magnetically recording and reproducing data tracks with respect to the data area of a magnetic tape at an azimuth angle $\theta°$, wherein the azimuth angle $\theta°$ with respect to the magnetic tape including two servo tracks respectively situated in the portions of the magnetic tape existing inwardly of the tape-width-direction two end portions of the magnetic tape and formed in a belt-like shape extending in parallel to the longitudinal direction of the magnetic tape, each of the servo tracks having therein a previously recorded servo track signal including position information recorded in the longitudinal direction of the magnetic tape for representing the position of the magnetic tape and tracking information recorded in parallel to the data tracks, is $0 \leq \theta \leq \tan^{-1}(10 p/a \times L)$, where the tape width of the magnetic tape is expressed as L (m), a data track pitch in the data area is expressed as p (m), and the longitudinal-direction greatest dimension change rate of the magnetic tape due to the temperature and humidity is expressed as a (%).

According to the present magnetic tape recording and reproducing apparatus, even in case where the magnetic tape recording medium is deformed in shape or changed in dimension, there can be prevented an offtrack error and thus the data tracks can be traced accurately in the data area.

Also, since the servo tracks are respectively disposed inwardly of the tape-width-direction two end portions of the magnetic tape, the tracking accuracy of the magnetic tape record and reproducing apparatus can be enhanced.

In addition, it is also an advantageous for the present magnetic tape recording and reproducing apparatus that the servo tracks are disposed such that said data area is interposed between them in the magnetic tape width direction, and the present magnetic tape recording and reproducing apparatus also includes: a position information magnetic head for reading the position information magnetically recorded in the longitudinal direction of the magnetic tape; a drum magnetic head for reading the tracking information; and, a control part for executing tracking control on the drum magnetic head according to the tracking information read by the drum magnetic head, and also for executing data cue-up control according to the position information read by the position information magnetic head.

That is, according to the present magnetic tape recording apparatus, since the servo tracks are disposed such that they exist inwardly of the tape-width-direction two end portions while the data area of the magnetic tape is interposed between them, the tracking accuracy of the drum magnetic head is enhanced.

Also, even in case where the magnetic tape recording medium is deformed in shape or changed in dimension, because the position information is magnetically recorded in the longitudinal direction of the magnetic tape, a read error by the position information magnetic head is hard to occur.

Further, it is more preferable for the present magnetic tape recording and reproducing apparatus that the servo tracks are disposed such that said data area is interposed between them in the magnetic tape width direction, and the present magnetic tape recording and reproducing apparatus also includes: a position information optical head for radiating light onto the position information composed of a pattern formed on the longitudinal-direction magnetic surface of the magnetic tape so as to be optically readable or a bit hole formed in the longitudinal direction of the magnetic tape to thereby read variations in the reflection factor of the light; a drum magnetic head for reading the tracking information; and, a control part for executing tracking control on the drum magnetic head according to the tracking information read by the drum magnetic head, and also for executing data cue-up control according to the position information read by the position information magnetic head.

According to the present magnetic tape recording apparatus, since the servo tracks are disposed such that they exist inwardly of the tape-width-direction two end portions while the data area of the magnetic tape is interposed between them, the tracking accuracy of the drum magnetic head can be enhanced.

Also, even in case where the magnetic tape recording medium is deformed in shape or changed in dimension, because the position information is composed of a pattern formed on the longitudinal-direction magnetic surface of the magnetic tape so as to be optically readable or a bit hole formed in the longitudinal direction of the magnetic tape, a read error by the position information optical head is hard to occur.

Moreover, it is advantageous for the present magnetic tape recording and reproducing apparatus to comprises: a position information magnetic head for reading the position information magnetically recorded in the longitudinal direction of the magnetic tape on the surface of the magnetic surface of the magnetic tape opposite to the magnetic surface of the magnetic tape on which the data area is to be recorded, or a position information optical head for radiating light onto the position information composed of an optically readable pattern to thereby read variations in the reflection factor of the light; a drum magnetic head for reading the tracking information; and, a control part for executing tracking control on the drum magnetic head according to the tracking information read by the drum magnetic head, and also for executing data cue-up control according to the position information read by the position information magnetic head or the position information optical head.

According to the present magnetic tape recording and reproducing apparatus, even in case where the magnetic tape recording medium is deformed in shape or changed in dimension, because the position information is magnetically recorded in the longitudinal direction of the magnetic tape or is composed of an optically readable pattern, a read error by the position information optical head is hard to occur.

Also, since the position information of the servo track signal is recorded on the opposite surface to the magnetic surface on which the data area is to be recorded, the data area can be spread by an amount equivalent to the area of the servo track where the position information is recorded, which makes it possible to increase the storage capacity of the magnetic tape recording medium.

According to a third aspect of the invention, there is provided a magnetic tape recording and reproducing method for magnetically recording and reproducing data tracks with respect to the data area of a magnetic tape at an azimuth angle θ°, wherein the azimuth angle θ° with respect to the magnetic tape including two servo tracks respectively situated in the portions of the magnetic tape existing inwardly of the tape-width-direction two end portions of the magnetic tape and formed in a belt-like shape extending in parallel to the longitudinal direction of the magnetic tape, each of the servo tracks having therein a previously recorded servo track signal including position information recorded in the longitudinal direction of the magnetic tape for representing the position of the magnetic tape and tracking information recorded in parallel to the data tracks, is $0 \leq \theta \leq \tan^{-1}(10\,p/a \times L)$, where the tape width of the magnetic tape is expressed as L (m), a data track pitch in the data area is expressed as p (m), and the longitudinal-direction greatest dimension change rate of the magnetic tape due to the temperature and humidity is expressed as a (%).

That is, according to the present magnetic tape recording and reproducing method, even in case where the magnetic tape recording medium is deformed in shape or changed in dimension, there can be prevented an offtrack error and thus the data tracks can be traced accurately in the data area.

Also, since the servo tracks are respectively disposed inwardly of the tape-width-direction two end portions of the magnetic tape, the tracking accuracy of the magnetic tape recording and reproducing method can be enhanced.

According to a fourth aspect of the invention, there is provided a magnetic tape cassette storing therein a magnetic tape recording medium as set forth in the first to third aspects of the invention, wherein the box body of the magnetic tape cassette is formed in a substantially rectangular parallelepiped; in the interior portion of the magnetic tape cassette box body, there is disposed a tape reel on which the magnetic tape recording medium is wound in the longitudinal direction thereof; and, the magnetic tape wound on said tape reel can be pulled out from the magnetic tape cassette box body or pulled into the interior portion of the magnetic tape cassette box body by rotating the tape reel.

According to the present magnetic tape cassette, since a magnetic tape is stored into the magnetic tape cassette and can be pulled out of the same by rotating the tape reel, it is possible to prevent dust from attaching to the magnetic tape.

In the present magnetic tape cassette, it is preferable to comprise a hold portion for holding the longitudinal-direction end portion of the magnetic tape recording medium which is pulled out from the magnetic tape cassette box body.

According to the present magnetic tape cassette, because the magnetic tape can be pulled out using the hold portion, the magnetic tape can be pulled out with no direct contact with the magnetic tape.

DETAILED DESCRIPTION OF THE PREFERRED EMBODIMENTS

Now, description will be given below of a magnetic tape recording medium and a magnetic tape recording and reproducing apparatus according to the invention with reference to the accompanying drawings.

Figure 1:
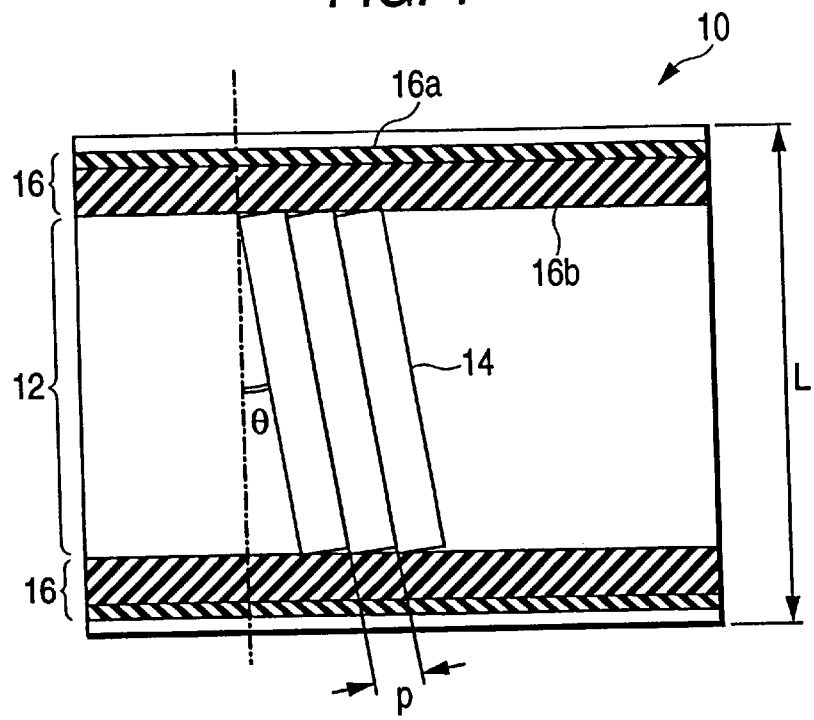
FIG. 1 is a structure view of a magnetic tape.
Figure 2:
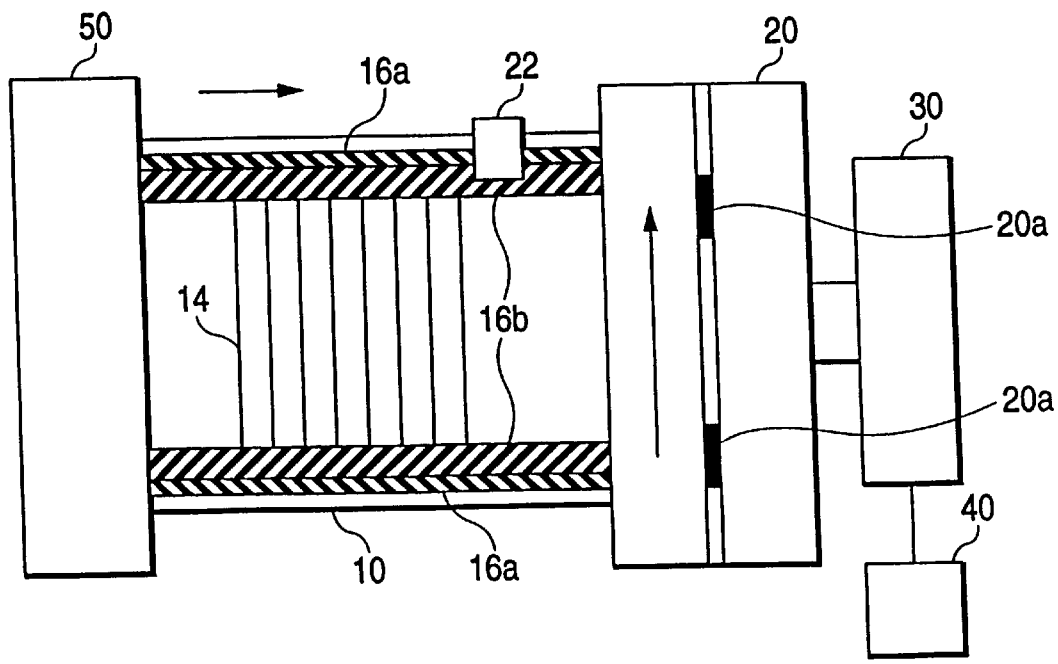
FIG. 2 is a structure view of the main portions of a first magnetic tape recording and reproducing apparatus.
Figure 3:
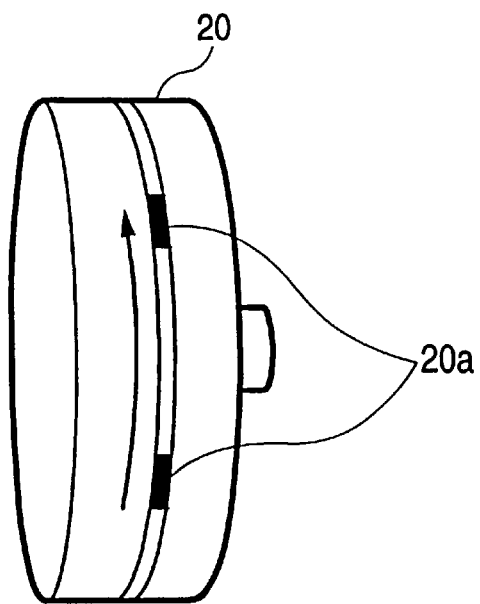
FIG. 3 is a perspective view of a drum magnetic head.
Figure 4:
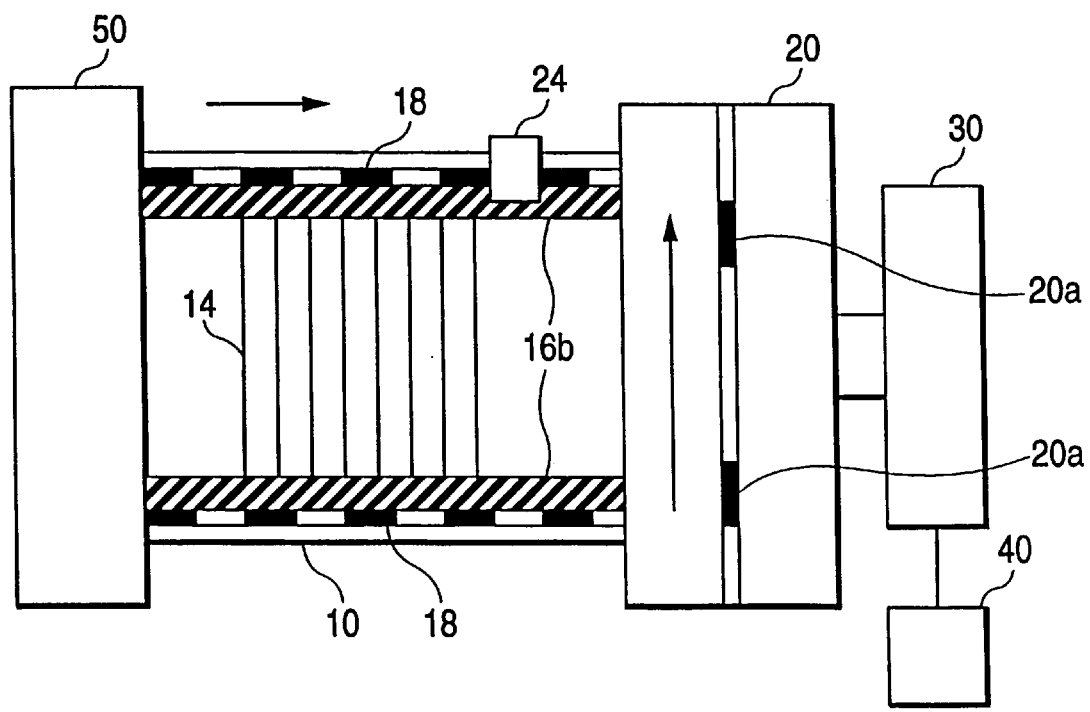
FIG. 4 is a structure view of the main portions of a second magnetic tape recording and reproducing apparatus.
Figure 5:
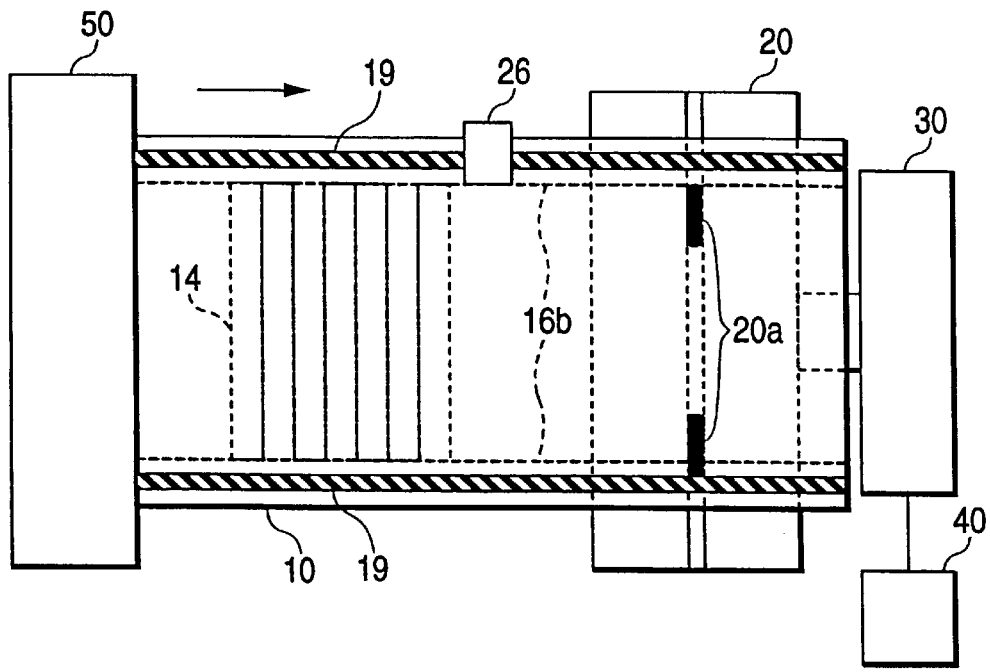
FIG. 5 is a structure view of the main portions of a third magnetic tape recording and reproducing apparatus.

FIG. 1 is a structure view of a magnetic tape, FIG. 2 is a structure view of the main portions of a first magnetic tape recording and reproducing apparatus, FIG. 3 is a perspective view of a drum magnetic head, FIG. 4 is a structure view of the main portions of a second magnetic tape recording and reproducing apparatus, and FIG. 5 is a structure view of the main portions of a third magnetic tape recording and reproducing apparatus.

Firstly, description will be given below of an embodiment of a magnetic tape recording medium with reference to FIG. 1.

A magnetic tape 10, which is an embodiment of a magnetic tape recording medium, is mainly divided into a data area 12, in which data can be stored, and a servo track 16. Also, the data area 12 and servo track 16 are both disposed on the magnetic surface of the magnetic tape 10 to which a magnetic substance is applied.

In the data area 12, due to at least one rotary head 20a of a drum magnetic head 20 which will be discussed later, a data track 14 forms an azimuth angle θ° with respect to the magnetic tape width direction (in FIG. 1, the vertical direction) and also data are recorded with a data track pitch p (m). By the way, in the data recording and reproducing operations, the magnetic tape 10 is fed in the magnetic tape longitudinal direction toward the drum magnetic head 20 by a feed mechanism (not shown).

Also, where the data track pitch is expressed as p (m), the magnetic tape width is expressed as L (m), and the greatest dimension change rate of the magnetic tape 10 in the longitudinal direction thereof is expressed as a (%), the azimuth angle θ° can be determined according to the following expression (1), That is:

Expression (1)

$$0 \leq \theta \leq \tan^{-1}(10\,p/a \times L) \tag{1}$$

For example, in case where the data track pitch p (m) is $10^{-5}$ (m), magnetic tape width L (m) is 0.051 (m) and greatest dimension change rate a is 0.005, the azimuth angle θ° can be obtained in the following manner: that is, 0≦θ≦0.029°, so that the data track 14 can be formed almost perpendicularly to the longitudinal direction of the magnetic tape 10.

In this manner, in case where the azimuth angle θ° is set according to the data track pitch p (m), magnetic tape width L (m) and greatest dimension change rate (%), even when the magnetic tape 10 is deformed in shape or changed in dimension due to the temperature and humidity and the data tracks are thereby overlapped, the data tracks can be traced accurately with no harmful effects on the tracing of the data tracks by the drum magnetic head 20.

By the way, since the greatest dimension change rate (%) of the magnetic tape 10 is the greatest dimension change rate when the temperature is 50° C. and the humidity is 80%, it fully satisfies the environmental condition of the operation assurance of the magnetic tape 10 or magnetic tape recording and reproducing apparatus.

In the servo track 16, a servo track signal is previously recorded whether a data track signal is recorded in the data track 14 of the data area 12 or not. The servo track 16 comprises a tracking track 16b, in which a tracking signal consisting of tracking information recorded in the width direction of the magnetic tape 10 is magnetically recorded, and a position track 16a in which a position signal consisting of position information recorded in the longitudinal direction of the magnetic tape 10 is magnetically recorded.

By the way, in the present embodiment, the servo track 16 is divided into the tracking track 16b and position track 16a but, alternatively, the tracking signal and position signal may be overlapped with each other in such a manner that the frequencies of them are different from each other.

Next, description will be given below of the structure of the first magnetic tape recording and reproducing apparatus with reference to FIGS. 2 and 3.

The magnetic tape 10 is fed in the magnetic tape longitudinal direction from a magnetic tape cassette 50 to the drum magnetic head 20 by a feed mechanism (not shown).

The magnetic drum head 20 includes at least one rotary head 20a and can be rotated by a drum magnetic head drive part 30, for example, in the upward direction in FIGS. 2 and 3 to thereby record the data of the data track 14 into the data area 12 or reproduce the same from the data area 12 while it forms an angle of the above-mentioned azimuth angle θ with respect to the width direction of the magnetic tape 10.

By the way, as shown in FIG. 3, the magnetic drum head 20 itself is a substantially cylindrical body, while the rotary head 20a rotates about the center axis of the present cylindrical body.

Also, in the recording and reproducing operations, the rotary head 20a is contacted with the magnetic tape 10 from one end of the width thereof (in FIG. 2, the upper end thereof) to read the tracking signal of the tracking track 16b and transmit it to a control part 40. And, the magnetic head drive part 30 is driven by the control part 40 to thereby execute tracking control on the drum magnetic head 20. Also, at the same time, in accordance with the tracking signal read by the drum magnetic head 20, when data are recorded or reproduced, the drum magnetic head 20 is driven synchronously with such data recording or reproducing operation.

After then, the rotary head 20a enters the data area 12 and, within the data area 12, records data therein or traces the data track 14 to thereby reproduce data recorded therein.

And, after it records or reproduces the data, the rotary head 20a reads the tracking signal of the tracking track 16b shown downwardly in FIG. 2 to thereby confirm the position of recording or reproduction of the data.

A position information magnetic head 22 is a fixed head which is fixed with respect to the magnetic tape 10 and, when the magnetic tape 10 is fed, the position information magnetic head 22 is contacted with the position track 16a to thereby read out a position signal from the position track 16a. In accordance with the-thus-read position signal, the control part 40 allows the feed mechanism to feed the magnetic tape 10 to a desired position, so that the data can be cued up.

Here, in the foregoing description, there is shown a structure which uses a single position information magnetic head 22 but, in order to enhance the data cueing accuracy, there may also be disposed another position information magnetic head which is used to read the position signal of the position track 16a shown downwardly in FIG. 2.

For example, in case where data to be read is specified, position information, in which the present data is recorded, is retrieved from the directory information of the magnetic tape 10 and the magnetic tape 10 is fed at a high speed to the position in which the data is recorded. By the way, the directory information may be recorded, for example, at the initial position of the magnetic tape 10 or in an information recording medium (for example, a semiconductor recording medium) (not shown) which is disposed within the magnetic tape cassette 50.

After the cueing operation is executed, the written data can be read out while enforcing tracking control.

This completes the description of the structure of the first magnetic tape recording and reproducing apparatus.

Next, description will be given below of the structure of the second magnetic tape recording and reproducing apparatus with reference to FIG. 4.

By the way, the parts of the second magnetic tape recording and reproducing apparatus, which are similar to those of the first magnetic tape recording and reproducing apparatus, are given the same designations and thus the description thereof is omitted here.

The second magnetic tape recording and reproducing apparatus is different from the first magnetic tape recording and reproducing apparatus in that the position signal of a position track 18 is not composed of a magnetically recorded signal, but it is composed of a pattern which is formed on the longitudinal-direction magnetic surface of the magnetic tape 10 so as to be optically readable, or a bit hole formed in the longitudinal direction of the magnetic tape 10.

And, the position signal is read by a position information optical head 24 which radiates light onto the position signal consisting of the above-mentioned pattern or bit hole to thereby read variations in the reflection factor of the light.

Accordingly, the position signal can be recorded in the magnetic tape 10 in the form of a pattern or a bit hole and thus, by reading the pattern or bit hole using the position information optical head 24, the position information can be read.

Next, description will be given below of the structure of the third magnetic tape recording and reproducing apparatus with reference to FIG. 5.

By the way, the parts of the third magnetic tape recording and reproducing apparatus, which are similar to those of the first magnetic tape recording and reproducing apparatus, are given the same designations and thus the description thereof is omitted here.

The third magnetic tape recording and reproducing apparatus is different from the first magnetic tape recording and reproducing apparatus in that a position track 19 is disposed on the opposite surface (back surface) of the magnetic surface of the magnetic tape 10, in which the data area 12 is to be recorded and also which extends in the longitudinal direction of the magnetic tape 10, while a position signal is magnetically recorded in the position track 19.

Also, the position track 19 is disposed on the opposite surface (back surface) of the magnetic surface 10 for recording of the data area 12 and extends in the longitudinal direction of the magnetic tape 10, while a position signal is recorded in the form of a pattern which can be read optically.

And, the position signal can be read by a position information magnetic head 26 which is capable of reading a magnetically recorded position signal, or by a position information optical head 26 which radiates light onto the position signal consisting of a pattern to thereby read variations in the reflection factor of the light.

Therefore, since the position information is recorded on the opposite surface (back surface) of the magnetic surface of the magnetic tape 10 in which the data area 12 is to be recorded, the data area 12 can be spread by an amount equivalent to the area portion (position track 16a) of the servo track 16 in which the position information is recorded, thereby being able to increase the storage capacity of the magnetic tape 10.

Next, description will be given below of the structure of the magnetic tape cassette 50, into which the magnetic tape 10 is to be stored and also which is to be loaded into the magnetic tape recording and reproducing apparatus, with reference to FIGS. 6 and 7.

Figure 6:
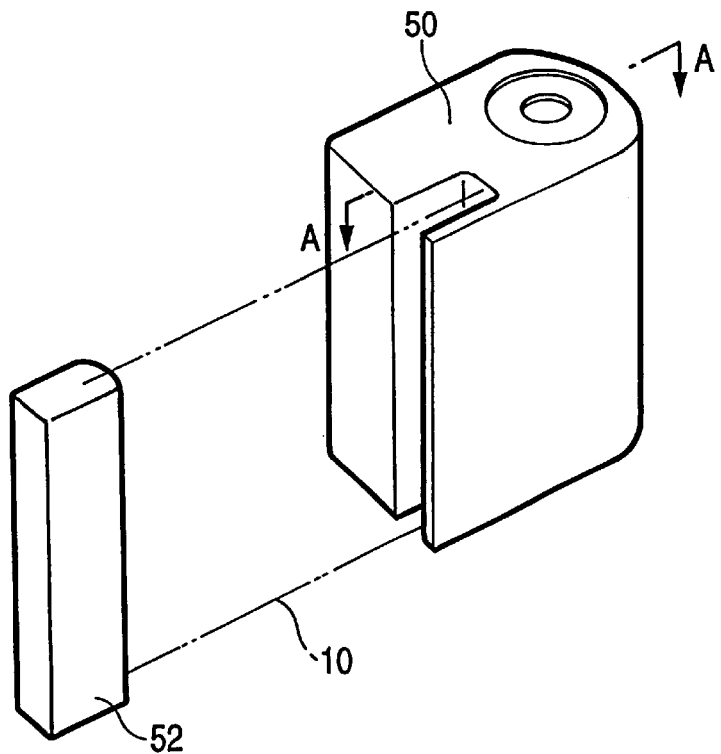
FIG. 6 is a perspective view of the outer shape of a magnetic tape cassette; and, FIG. 7 is a section view taken along the line A—A shown in FIG. 6.
Figure 7:
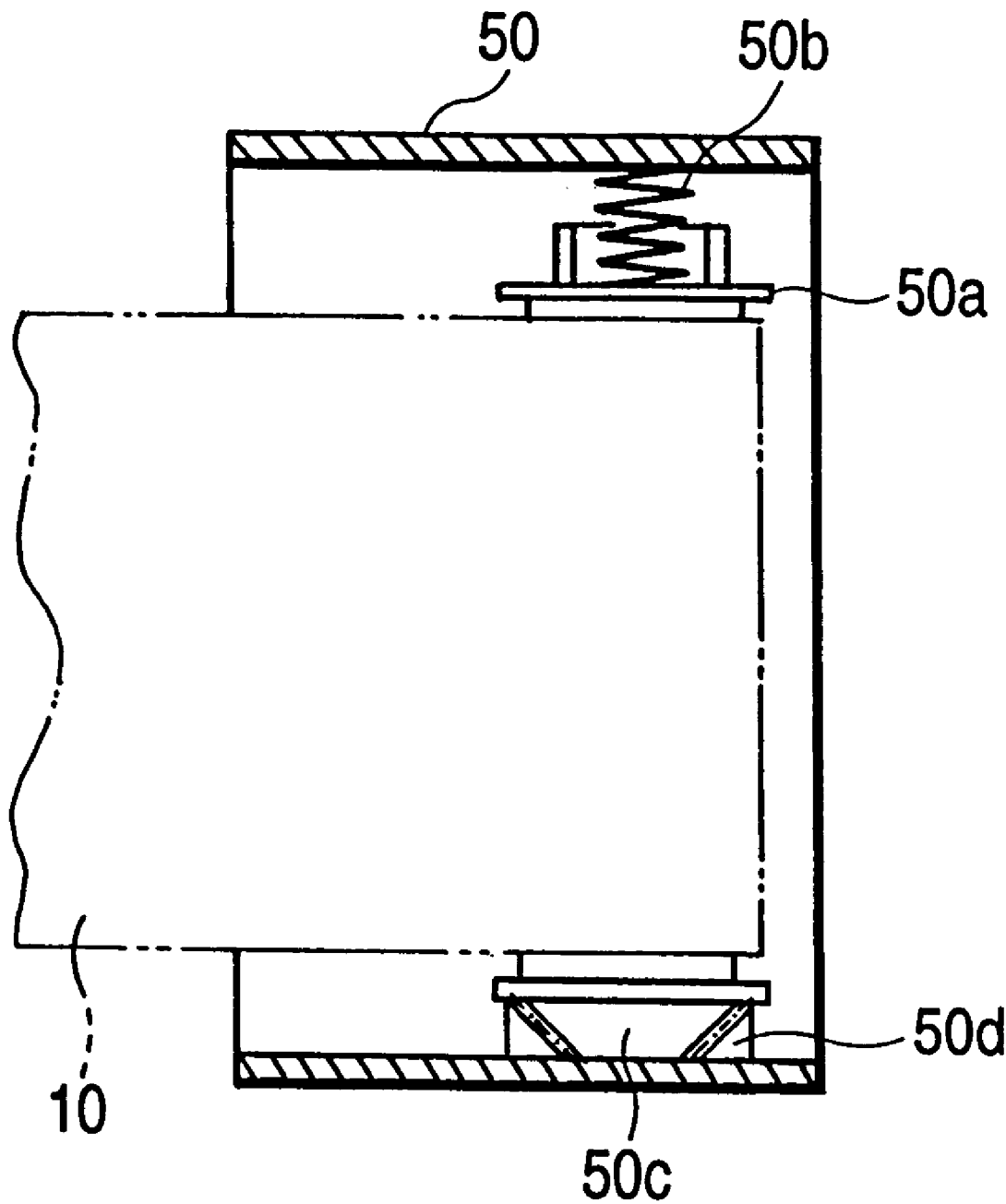

Here, FIG. 6 is a perspective view of the external shape of the magnetic tape cassette 50 and FIG. 7 is a section view thereof taken along the line A—A shown in FIG. 6.

The magnetic tape cassette 50 has a substantially rectangular-parallelepiped-like shape, the magnetic tape 10 is wound around the tape reel 50a of the magnetic tape cassette 50 by a given length, and the longitudinal-direction end portion of the magnetic tape 10 that is pulled out from the magnetic tape cassette 50 is held by and in a block 52 which serves as the hold portion of the magnetic tape cassette 50. Also, in case where the block 52 is fitted into a recessed portion formed in the magnetic tape cassette 50, the block 52 also can fulfill a cover function to prevent dust from entering the interior portion of the magnetic tape cassette 50.

The axial-direction one end of the tape reel 50a disposed in the interior portion of the magnetic tape cassette 50 is energized toward the axial-direction other end of the tape reel 50a by an elastic member such as a spring 50b. And, on the surface of the other end of the tape reel 50a, there is disposed a gear 50c which can be engaged with a gear 50d disposed on the inner end face of the magnetic tape cassette 50; that is, in case where the gears 50c and 50d are engaged with each other, the tape reel 50a can be braked and thus can be prevented from rotating freely.

By the way, the structure for braking the tape reel 50a is not limited to the present structure using the mutual engagement between the gears but, for example, there can also be employed a structure in which two members each having a given coefficient of friction are slidingly contacted with each other.

In case where the magnetic tape cassette 50 is loaded into the magnetic tape recording and reproducing apparatus, the gear 50c is energized in the reel axial direction, that is, in the direction of the spring 50b and is thereby removed from the engaged or braked state by a brake removing device (not shown) disposed in the magnetic tape recording and reproducing apparatus, with the result that tape reel 50a can be rotated freely.

After then, the block 52 is pulled out from the magnetic tape cassette 50 by a block grip device (not shown) disposed in the magnetic tape recording and reproducing apparatus and, at the same time, the magnetic tape 10 held by and in the block 52 is also pulled out, so that the magnetic tape 10 can be set at a given position in the magnetic tape recording and reproducing apparatus and thus data can be recorded into the magnetic tape or can be reproduced therefrom.

According to the magnetic tape recording medium of the invention, even in case where there occur shape deformation and/or dimension change in the magnetic tape recording medium, an offtrack error can be prevented and the data track can be traced in the data area with accuracy.

Also, since the two servo tracks are respectively disposed on the inner sides of the two end portions of the magnetic tape, the tracking accuracy of the drum magnetic head can be enhanced.

Further, because the servo track signal is previously recorded in the servo track, there can be reduced an harmful effect on tracing variations inevitably occurring in the recording and reproducing tracing operations of a magnetic tape recording and reproducing apparatus which is used to record and reproduce the magnetic tape recording medium.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A magnetic tape recording medium comprising:

a data area on which data tracks having an azimuth angle θ° are recorded and reproduced sequentially; and two servo tracks disposed between both end portions of said magnetic tape recording medium in a width direction of said magnetic tape recording medium, each of said two servo tracks extending in a longitudinal direction of said magnetic tape recording medium and having therein a previously recorded servo track signal that includes position information recorded in the longitudinal direction representing a position of said magnetic tape recording medium and also includes tracking information recorded in parallel to said data tracks, wherein said azimuth angle θ° satisfies an equation of:

$$0 \le \theta \le \tan^{-1}\left(\frac{10p}{a \times L}\right),$$

where a width of said magnetic tape recording medium in the width direction is expressed as L(m), a data track pitch in said data area is expressed as p(m), and the greatest dimension change rate of said magnetic tape recording medium in the longitudinal direction due to a temperature and humidity is expressed as (a) (%) 10 p.

2. The magnetic tape recording medium as set forth in claim 1, wherein said data area is interposed between said two servo tracks in the width direction of said magnetic tape recording medium.

3. The magnetic tape recording medium as set forth in claim 2, wherein said position information of said servo track signal is magnetically recorded in the longitudinal direction of said magnetic tape recording medium.

4. The magnetic tape recording medium as set forth in claim 2, wherein said position information of said servo track signal comprises an optically readable pattern formed on a magnetic surface of said magnetic tape recording medium.

5. The magnetic tape recording medium as set forth in claim 2, wherein said position information of said servo track signal comprises bit holes that are formed in the longitudinal direction of said magnetic tape.

6. The magnetic tape recording medium as set forth in claim 1, wherein said position information of said servo track signal is formed on a surface opposite to a surface on which said data area exists.

7. The magnetic tape recording medium as set forth in claim 6, wherein said position information of said servo track signal is magnetically recorded in the longitudinal direction of said magnetic tape recording medium.

8. The magnetic tape recording medium as set forth in claim 6, wherein said position information of said servo track signal comprises an optically readable pattern formed in the longitudinal direction of said magnetic tape recording medium.

9. The magnetic tape recording medium as set forth in claim 6, wherein said position information of said servo track signal comprises bit holes that are formed in the longitudinal direction of said magnetic tape recording medium.

10. A magnetic tape recording and reproducing apparatus for magnetically and sequentially recording and reproducing data tracks that are provided on a data area of a magnetic tape recording medium at an azimuth angle θ°,
   wherein said magnetic tape recording medium comprises:
       the data area on which said data tracks having the azimuth angle θ° are recorded and reproduced sequentially; and
       two servo tracks disposed between both end portions of said magnetic tape recording medium in a width direction of said magnetic tape recording medium, each of said two servo tracks extending in a longitudinal direction of said magnetic tape recording medium and having therein a previously recorded servo track signal that includes position information recorded in the longitudinal direction representing a position of said magnetic tape recording medium and also includes tracking information recorded in parallel to said data tracks, wherein said azimuth angle θ° satisfies an equation of:

$$0 \leq \theta \leq \tan^{-1}\left(\frac{10p}{a \times L}\right),$$

where a width of said magnetic tape recording medium in the width direction is expressed as L (m), a data track pitch in said data area is expressed as p (m), and the greatest dimension change rate of said magnetic tape recording medium in the longitudinal direction due to a temperature and humidity is expressed as (a) (%).

11. The magnetic tape recording and reproducing apparatus as set forth in claim 10, further comprising:
   a position information head for reading said position information;
   a drum magnetic head for reading said tracking information; and,
   a control part for executing tracking control on said drum magnetic head according to said tracking information read by said drum magnetic head, and also for executing data cue-up control according to said position information read by said position information head.

12. The magnetic tape recording and reproducing apparatus as set forth in claim 11, wherein said data area is interposed between said servo tracks in the width direction,
   said position information head is a position information magnetic head for reading said position information magnetically recorded in the longitudinal direction, and
   said control part is a control part for executing tracking control on said drum magnetic head according to said tracking information read by said drum magnetic head, and also for executing data cue-up control according to said position information read by said position information magnetic head.

13. The magnetic tape recording and reproducing apparatus as set forth in claim 11, wherein said data area is interposed between said servo tracks in the width direction, and wherein
   said position information head is a position information optical head for radiating light onto said position information that comprises one of an optically readable pattern formed on a magnetic surface extending in the longitudinal direction of said magnetic tape recording medium and a bit hole formed in the longitudinal direction of said magnetic tape recording medium, to thereby read variations in the reflection factor of said light, and
   said control part is a control part for executing tracking control on said drum magnetic head according to said tracking information read by said drum magnetic head, and also for executing data cue-up control according to said position information read by said position information optical head.

14. The magnetic tape recording and reproducing apparatus as set forth in claim 11, wherein said position information head is a position information magnetic head for reading said position information magnetically recorded in the longitudinal direction of said magnetic tape recording medium on a surface of said medium opposite to a surface on which said data area is recorded, and
   said control part is a control part for executing tracking control on said drum magnetic head according to said tracking information read by said drum magnetic head, and also for executing data cue-up control according to said position information read by said position information magnetic head.

15. The magnetic tape recording and reproducing apparatus as set forth in claim 11, wherein said position information head is a position information optical head for radiating light onto said position information having an optically readable pattern to thereby read variations in the reflection factor of said light, and
   said control part is a control part for executing tracking control on said drum magnetic head according to said tracking information read by said drum magnetic head, and also for executing data cue-up control according to said position information read by said position information optical head.

16. A magnetic tape recording and reproducing method for magnetically recording and reproducing data tracks with respect to a data area of a magnetic tape recording medium at an azimuth angle θ°, wherein said magnetic tape recording medium comprises:
   the data area on which said data tracks having the azimuth angle θ° are recorded and reproduced sequentially; and
   two servo tracks disposed between both end portions of said magnetic tape recording medium in a width direction of said magnetic tape recording medium, each of said two servo tracks extending in a longitudinal direction of said magnetic tape recording medium and having therein a previously recorded servo track signal that includes position information recorded in the longitudinal direction representing a position of said magnetic tape recording medium and also includes tracking information recorded in parallel to said data tracks, wherein said azimuth angle θ° satisfies an equation of:

$$0 \leq \theta \leq \tan^{-1}\left(\frac{10p}{a \times L}\right),$$

where a width of said magnetic tape recording medium in the width direction is expressed as L (m), a data track pitch in said data area is expressed as p (m), and the greatest dimension change rate of said magnetic tape recording medium in the longitudinal direction due to a temperature and humidity is expressed as (a) (%).

17. A magnetic tape cassette storing therein a magnetic tape recording medium as set forth in any one of claims 1 to 4, said magnetic tape cassette comprising:
    a box body formed in a substantially rectangular parallelepiped; and
    a tape reel disposed in the interior portion of said magnetic tape cassette box body, said magnetic tape recording medium being wound on said tape reel,
    wherein said magnetic tape wound on said tape reel can be pulled out from said magnetic tape cassette box body or pulled into the interior portion of said magnetic tape cassette box body by rotating said tape reel.

18. A magnetic tape cassette as set forth in claim 17, further including:
    a hold portion for holding an end portion of said magnetic tape recording medium in the longitudinal direction that is pulled out from said magnetic tape cassette box body.

* * * * *